July 10, 1956
K. GOLDSMITH
2,754,478
APPARATUS FOR MEASURING DIELECTRIC
PROPERTIES OF MATERIALS
Filed July 21, 1952
2 Sheets-Sheet 1
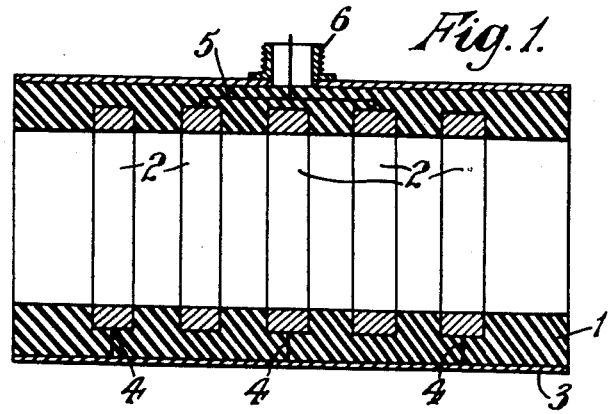
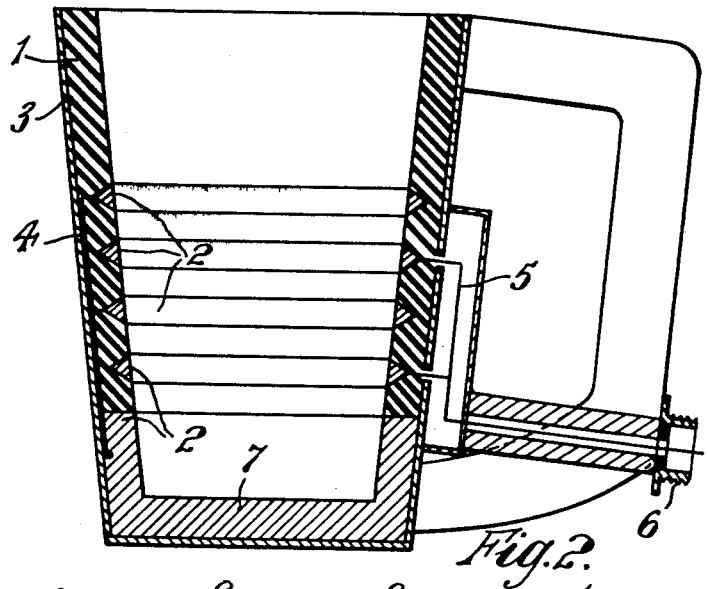
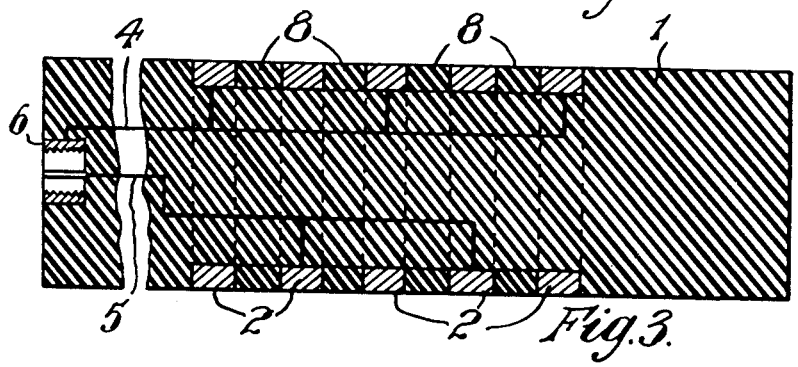
INVENTOR
KURT GOLDSMITH
BY
Campbell, Brumbaugh, Free & Graves
ATTORNEYS United States Patent Office 2,754,478
Patented July 10, 1956

2,754,478
APPARATUS FOR MEASURING DIELECTRIC PROPERTIES OF MATERIALS

Kurt Goldsmith, Claughton, England, assignor to Lever Brothers Company, New York, N. Y., a corporation of Maine Application July 21, 1952, Serial No. 300,001

Claims priority, application Great Britain July 27, 1951

7 Claims. (Cl. 324—61)

This invention relates to apparatus, hereinafter referred to as the test capacitor, for measuring dielectric properties of materials such as granular or particulated materials, plastic materials or liquids.

It is an object of the present invention to provide a novel and improved test capacitor.

According to the present invention there is provided a test capacitor for measuring dielectric properties of materials which comprises a support member of insulating material and not less than three co-axially displaced electrodes in the form of rings supported by and co-axial with the support member.

The number of electrodes is preferably odd and alternate electrodes are preferably electrically connected to one another.

The support member may be in the form of a rod with the electrodes situated on the outside. The support member may also be in the form of a hollow tube with the electrodes situated either on the outside or on the inside, and one end of the tube may be closed. The surfaces of the electrodes may be prevented from coming into contact with the material to be tested by coating them with an insulating material or by covering them with a sheath of insulating material. The sheath or coating may be integral with the support member so that the electrodes are embedded wholly within the support member. In order to limit the effect of stray capacitances, a sheath of conducting material may be used as a screen.

Though the preferred cross-section is circular it may be desirable for special purposes to use rectangular, triangular or other shapes, and the reference to the co-axial disposition is not meant to exclude shapes which are not circular.

Preferred forms of the test capacitor according to the present invention will now be described with reference to the accompanying drawings.

Fig. 1 shows a cross-section of a test capacitor in the form of a hollow tube.

Fig. 2 shows a cross-section of a test capacitor in the form of a beaker.

Fig. 3 shows a cross-section of a test capacitor in the form of a dipstick.

Like reference numerals will be used to describe like parts.

Figure 4:
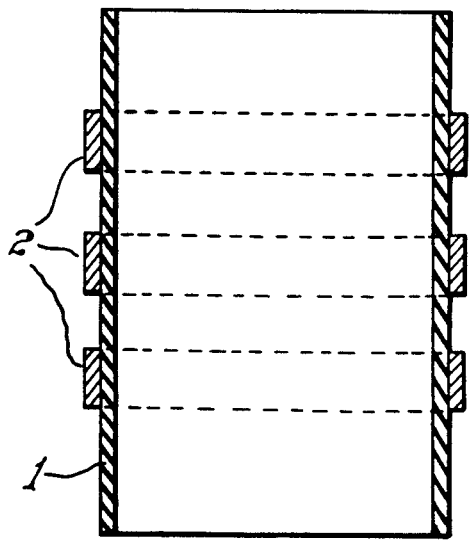
Fig. 4 shows a cross-section of an alternative form of a test capacitor in the form of a hollow tube.

Referring to Fig. 1, the support member 1 of insulating material is in the form of a hollow tube. Five electrodes 2 in the form of rings are embedded in the cylinder in such a manner that the inner surfaces of the electrode rings are flush with the inner surface of the cylinder to form one continuous surface. The outside of the tube is covered by a sheath of conducting material 3 which is electrically connected to alternate electrodes, starting with the electrode near one end of the cylinder, by means of stiff wires 4. The other electrodes are electrically connected by a stiff wire 5 which terminates in a co-axial outlet 6. The housing of the co-axial outlet is electrically connected to the conducting material 3. In use, the electrodes near the end of the cylinder and the electrode electrically connected to them are earthed, the other electrodes being live. Thus the wire 4 will be earthed and the wire 5 will be live. The two outer electrodes also act as guard rings. It will be evident that, provided the cylinder is filled with material which extends beyond the two outer electrodes, the electrode assembly encloses a fixed effective volume. The conducting material 3 on the outside of the cylinder acts as a screen to limit the effects of stray capacitances.

Fig. 2 shows a test capacitor in the form of a cup or beaker. The tube 1, which is of circular cross section, is tapered and is provided with a handle to form a beaker. Five electrodes 2 are embedded in the tube, the electrode near the smaller end of the tube being integral with an extension piece 7 which completely closes the small end. Alternate electrodes, starting with the electrode near one of the ends of the beaker, are electrically connected by means of a stiff wire 4, the other electrodes being connected by means of a stiff wire 5 terminating in a co-axial outlet 6. The outside of the tube is covered by a sheath of conducting material 3, which is electrically connected to the extension piece 7 which closes the small end of the tube and to the housing of the co-axial outlet 6.

In one particular embodiment for the measurement of the moisture content of particulated material having a particle diameter of up to approximately $\frac{1}{32}$ inch, an effective cup diameter of 2 inches was used, the electrode rings being $\frac{1}{4}$ inch wide and spaced with their edges $\frac{1}{4}$ inch apart.

Fig. 3 shows a test capacitor in the form of a dipstick. It comprises a rod of insulating material having the electrode rings 2 situated on the outside. Between the electrode rings 2 there are situated spacer rings 8 made of insulating material. The outer surface of the rings is flush with the outer surface of the rod so as to form a continuous surface. Alternate electrodes, starting with an electrode near one of the ends of the rod, are connected by means of a stiff wire 4, the other electrodes being connected by means of a stiff wire 5. The wire 5 terminates in a co-axial outlet 6, the housing of which is electrically connected to the wire 4.

The support member may also be in the form of discs or rings which separate the electrodes, and the electrodes may be in the form of discs provided with a small hole or holes to enable the connecting wires 4, 5 to pass through them. Thus references to the electrodes being in the form of rings is intended, where applicable, to include discs or plates.

If desired, those surfaces of the electrodes which are intended to come into contact with the material to be tested may be coated with an insulating material or be covered by a thin sheath of insulating material. For example, a thin walled tube of insulating material having the same external diameter as the internal diameter of the electrode rings may be inserted into the test capacitor shown in Fig. 1. Alternatively, the electrodes may be situated on the outside of a support member in the form of a hollow tube, as is shown in Figs. 4 and 5.

Fig. 4 shows a test capacitor in which the support member 1 of insulating material is in the form of a hollow tube. Three electrodes 2 are situated on the outside of the tube which has a smooth internal bore. The connections to the electrodes are not shown. This type of capacitor, like that shown in Fig. 1, is particularly useful in conjunction with a pipe system.

Figure 5:
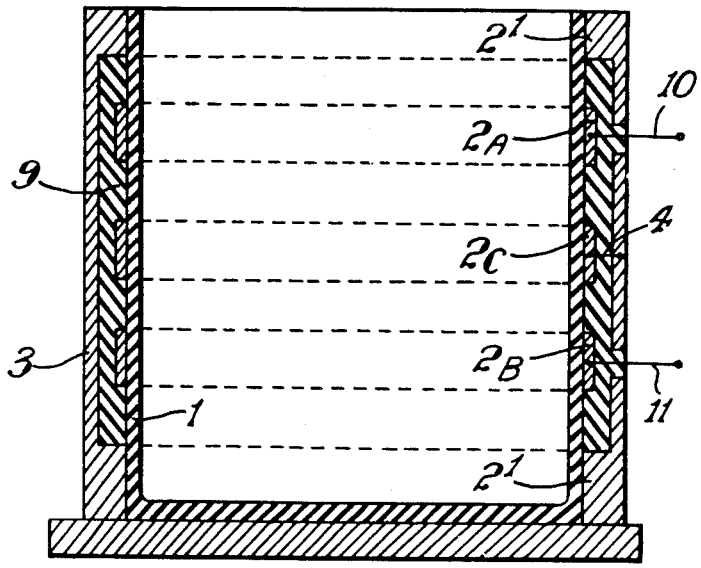
Fig. 5 shows a cross-section of an alternative form of a test capacitor in the form of a beaker.

Fig. 5 shows a test capacitor in the form of a beaker. The support 1 of insulating material is in the form of a hollow tube with one of its ends closed by a piece of insulating material integral with the tube. Five electrodes, namely electrodes 2A, 2B, 2C, and two end electrodes 2', one adjacent each end of the tube, are situated on the outside of the tube. The sheath 3 of conducting material is made integral with the end electrodes 2'. The sheath also covers the closed end of the tube. The sheath is connected to the centre electrode 2c by means of a wire 4. The spaces between the sheath 3 and the electrodes 2A, 2B, 2C, and the support member 1 may be air-filled, but are preferably occupied by an insulator 9.

In one embodiment of the beaker shown in Fig. 5, the internal diameter of the support member was 6 inches, the wall thickness being ¼ inch. The electrode rings were 1 inch and were spaced 1 inch apart.

In order to describe some of the ways in which the electrodes may be connected to a measuring circuit, separate connecting wires 10, 11 are shown for electrodes 2A and 2B. For example, wires 10 and 11 may be joined, if desired, within the insulator 9, to provide a two-terminal network. The test capacitor may also be used as a three-terminal network, for example by connecting the source between the electrode 2c (which is internally connected to the electrodes 2') and the electrode 2A, and a measuring device between the electrode 2B and the electrode 2c (which is internally connected to the electrodes 2'). In either of these arrangements, the sheath 3 may be disconnected from the electrode 2c. Also, the electrodes 2' may be separate and insulated from the sheath 3, but, if desired, may still be connected to the central electrode 2c. It will be evident that some of these alternative arrangements are also applicable to some of the other embodiments.

The type of material for the support member and the electrodes depends on such factors as the material to be tested, the temperature of the material, and so on. For the support member, polystyrene is preferred for use at low temperatures and ceramic for use at high temperatures. The support member illustrated in Figs. 4 and 5 may be made of glass. For the electrodes, brass has been found to be a suitable material but in some applications it may be desirable to use stainless steel. It is also possible to form electrode rings by depositing conducting material on the support member, for example in the form of a conducting paint, such as colloidal graphite or, alternatively, by metal spraying.

I claim:

1. A test capacitor for measuring dielectric properties of materials which comprises a support member of insulating material in the form of a hollow tube and not less than three co-axially displaced electrodes in the form of complete rings situated on the outside of and co-axial with the tube, alternate electrodes being electrically connected to one another, and a sheath of conducting material co-axial with the support member and surrounding the outer surface of the electrodes and insulated therefrom.

2. A test capacitor as claimed in claim 1 in which one end of the tube is closed.

3. A test capacitor for measuring dielectric properties of materials which comprises a support member of insulating material in the form of a hollow tube having one of its ends closed and an odd number not less than three of co-axially displaced electrodes in the form of complete rings situated on the outside of and co-axial with the tube, alternate electrodes being electrically connected to one another, and a sheath of conducting material co-axial with the support member and surrounding the outer surfaces of the electrodes, said sheath being insulated from the two electrodes adjacent to the centre electrode and from such other electrodes as are electrically connected to the said two electrodes.

4. A test capacitor for measuring dielectric properties of materials which comprises a support member of insulating material in the form of a hollow tube and an odd number of not less than three co-axially displaced electrodes in the form of complete rings situated on the inside of and co-axial with the tube, alternate electrodes being electrically connected to one another, and a sheath of conducting material covering the outside of the tube.

5. A test capacitor for measuring dielectric properties of materials which comprises a support member of insulating material in the form of a hollow tube having an odd number of not less than three co-axially displaced electrodes in the form of complete rings situated on the inside of and co-axial with the tube, alternate electrodes being electrically connected to one another, and a piece of conducting material closing one end of said tube and integral with the nearest electrode.

6. A test capacitor as claimed in claim 5 in which the outside of the tube is covered by a sheath of conducting material electrically connected to the piece closing the end of the tube.

7. A test capacitor for measuring dielectric properties of materials which comprises a support member of insulating material in the form of a hollow tube having an odd number not less than three of co-axially displaced electrodes in the form of complete rings embedded in the tube with the inner surface of the rings flush with the inner surface of the tube to form a smooth surface, alternate electrodes being electrically connected to one another, a piece of conducting material closing one end of said tube and integral with the electrode adjacent to the said end, and sheath of conducting material covering the outside of the tube and electrically connected to the piece closing the said end.

References Cited in the file of this patent

UNITED STATES PATENTS

| | | |
|---|---|---|
| 1,984,166 | Walter | Dec. 11, 1934 |
| 2,122,363 | Christie | June 28, 1938 |
| 2,285,152 | Firestone | June 2, 1942 |
| 2,289,687 | Stuart | July 14, 1942 |
| 2,328,853 | Sherrard | Sept. 7, 1943 |
| 2,373,846 | Olken | Apr. 17, 1945 |
| 2,555,977 | Kline | June 5, 1951 |
| 2,604,513 | Parkinson et al. | July 22, 1952 |